United States Patent
Lee

(10) Patent No.: US 7,779,272 B2
(45) Date of Patent: Aug. 17, 2010

(54) HARDWARE CRYPTOGRAPHIC ENGINE AND ENCRYPTION METHOD

(75) Inventor: Sung-Woo Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1667 days.

(21) Appl. No.: 10/928,404

(22) Filed: Aug. 30, 2004

(65) Prior Publication Data

US 2005/0050340 A1 Mar. 3, 2005

(30) Foreign Application Priority Data

Aug. 29, 2003 (KR) ...................... 10-2003-0060204

(51) Int. Cl.
*G06F 11/30* (2006.01)
*G06F 12/14* (2006.01)
*H04K 1/00* (2006.01)
*H04L 9/00* (2006.01)
*H04L 9/28* (2006.01)

(52) U.S. Cl. ......................... 713/189; 713/191; 380/28; 380/277

(58) Field of Classification Search ................. 713/189, 713/191; 380/28, 277
See application file for complete search history.

(56) References Cited

U.S. PATENT DOCUMENTS

| | | | |
|---|---|---|---|
| 6,108,419 A | | 8/2000 | LaMacchia et al. |
| 6,278,783 B1 * | | 8/2001 | Kocher et al. ............... 380/277 |
| 2001/0031050 A1 | | 10/2001 | Domstedt et al. |
| 2003/0149883 A1 * | | 8/2003 | Hopkins et al. ............. 713/191 |
| 2003/0159036 A1 * | | 8/2003 | Walmsley et al. ........... 713/168 |
| 2006/0104438 A1 * | | 5/2006 | Giraud ........................ 380/28 |
| 2008/0130869 A1 * | | 6/2008 | Akkar et al. .................. 380/28 |

FOREIGN PATENT DOCUMENTS

| | | |
|---|---|---|
| EP | 1 215 841 A2 | 6/2002 |
| EP | 1 237 322 A2 | 9/2002 |
| KR | 1020050015857 A | 2/2005 |

OTHER PUBLICATIONS

"XOR gate", Wikipedia English, Online, <http://en.wikipedia.org/wiki/XOR_gate> (3 pp.).
Gillett, J.B., Checking Data Encryption Engines, (Feb. 1983) IBM Technical Disclosure Bulletin, vol. 25, No. 9, pp. 4931, XP002335588.

(Continued)

*Primary Examiner*—Shin-Hon Chen
(74) *Attorney, Agent, or Firm*—Harness, Dickey & Pierce, P.L.C.

(57) ABSTRACT

A hardware cryptographic engine for encrypting transmission data may include a plurality of ciphertext engines that generate intermediate ciphertexts and final ciphertexts. At least one of the ciphertext engines may receive an intermediate ciphertext output from at least one neighboring ciphertext engine to generate a corresponding intermediate ciphertext and final ciphertext. A method of encrypting transmission data may include inputting a second intermediate ciphertext of a second ciphertext engine to a first ciphertext engine and generating a first intermediate ciphertext of the first ciphertext engine using the second intermediate ciphertext.

14 Claims, 7 Drawing Sheets

OTHER PUBLICATIONS

Easter, R.J., et al., S/390 Parallel Enterprise Server CMOS Cryptographic Coprocessor, (1999), IBM Journal of Research and Development, vol. 43, No. 5, pp. 761-776, XP002335589.

Saggese, G.P., et al., Hardware Support for High Performance Intrusion-and Fault-Tolerant Systems, (Oct. 18, 2004), Proceedings of the 23$^{rd}$ International Symposium on Reliable Distributed Systems (SRDS '04), pp. 195-204, XP010737883.

Dandalis, Andreas et al., An Adaptive Cryptographic Engine for IPSec Architectures, (Apr. 17, 2000), IEEE Symposium on Napa Valley, CA, USA, pp. 132-141, XP010531932.

Korean Office Action dated Aug. 22, 2005 and Translation.

Office Action issued by the Chinese Patent Office on Jun. 19, 2009, for a corresponding Chinese application.

* cited by examiner

HARDWARE CRYPTOGRAPHIC ENGINE AND ENCRYPTION METHOD

This application claims priority under 35 U.S.C. §119 to Korean Patent Application No. 2003-60204, filed Aug. 29, 2003, the content of which is incorporated herein by reference in its entirety.

BACKGROUND OF THE INVENTION

1. Field of the Invention

The present invention relates generally to a hardware cryptographic engine, and more particularly, to a hardware cryptographic engine.

2. Description of the Related Art

Users may transmit information using smart cards (or IC cards), Internet communications, wireless LAN communications and the like. Some of the transmissions may involve secret information for which security may be maintained. To this end, a hardware cryptographic engine may be implemented for encrypting the information. The encrypted information may be referred to as ciphertext. The hardware cryptographic engine may perform cryptographic algorithms with an appropriate key to produce the ciphertext.

Attackers, who seek unauthorized access to the information, may employ attack methods that focus on theoretical weaknesses of the cryptographic algorithms. These attack methods may allow an attacker to decrypt communications. Attack methods implementing theoretical approaches may have been successful in only very limited conditions.

Attackers may also employ attack methods that involve monitoring a physical property of the cryptographic operation. Such physical properties may include, for example, a difference of power consumption amounts and a time difference of performed operations. Attack methods based on monitoring a physical property may acquire keys (which are used by the cryptographic algorithm for encryption and decryption purposes) in less time and with less effort than attack methods based on theoretical weaknesses.

An encryption operation may be implemented by hardware (e.g., smart cards). Public key algorithms, such as RSA and ECC for example, may be implemented by hardware. In public key cryptography, a public key may be used to perform encryption operations. Symmetric key algorithms, such as the data encryption standard (DES) and the advanced encryption standard (AES) for example, may also be implemented by hardware. In both public key and symmetric key systems, it is desirable to keep secret information from an attacker.

FIG. 1 is a block diagram of a prior art hardware cryptographic engine that may perform a parallel processing technique. This hardware cryptographic engine may implement the DES algorithm (for example) by which two ciphertext engines 100, 200 may operate independently and in parallel to process encryption. The parallel ciphertext engines 100, 200 may respectively generate two identical ciphertexts (CRYPTA) from transmission data (TXD). Each of the ciphertext engines 100, 200 may generate the ciphertext (CRYPTA) from transmission data (TXD) via 16 round operations. That is, as shown in FIG. 1, each of the round blocks (rounds 1 through 16) may perform an encryption operation according to the DES algorithm using a predetermined key. All 16 rounds may be completed to generate the ciphertext (CRYPTA).

Keys may be used by the respective round blocks (rounds 1 through 16). The keys may be generated by a key schedule of an additional key generation algorithm. For example, if an 8-byte DES key is used, then the keys of rounds 1 through 16 may be generated. Depending on the particular application, the keys may be different from each other, the keys may be the same, and the keys may be private keys or open keys.

If ciphertexts (CRPTA) output from the two parallel ciphertext engines 100, 200 are identical, then the ciphertext (CRYPTA) may be transmitted to a desired destination node through a predetermined transmission module. However, if a fault occurs during the encryption operations, ciphertexts output respectively from the two parallel ciphertexts engines 100, 200 may not be identical. In this case, to prevent leakage of secret information, the ciphertext (CRYPTA) may not be transmitted to the destination node.

FIG. 2 is a schematic diagram of two round blocks depicted in FIG. 1. Each of the round blocks (rounds 1 through 16) of the first and the second ciphertext engines 100, (200) may include an encryption unit 120, (220) and an exclusive OR (XOR) logic 110, (210). When the first and the second ciphertext engines 100, 200 respectively encrypt transmission data (TXD) through 16 rounds and identical ciphertexts (CRYPTA) are output, the subsequent circuits may transmit the ciphertext (CRYPTA), which may be determined to not have a fault, to a destination node. When a mechanical fault occurs during the encryption operation, the ciphertexts (CRYPTA) output respectively from the two parallel ciphertext engines 100, 200 may not be identical. To prevent leakage of secret information, the ciphertext (CRYPTA) may not be transmitted to the destination node.

The prior art device depicted in FIG. 1 is not without shortcomings. For example, respective faults may occur in identical locations of the first and the second ciphertext engines 100, 200. As shown in FIG. 2, the respective faults may transform an original ciphertext A into a faulted ciphertext A' in the block of the ciphertext engine 100 and the block of the ciphertext engine 200. In this case, notwithstanding the faults, the final ciphertexts (CRYPTA) output respectively from the two parallel ciphertext engines 100, 200 may still be identical, and the ciphertext (CRYPTA) may be transmitted to a destination node. This may lead to secret information being leaked out from the hardware cryptographic engine. For example, the mechanical fault occurring in the hardware cryptographic engine may be generated by an unauthorized hacker. The hacker may then find keys used in the algorithm by analyzing the ciphertexts having the fault.

Research on the possibility of these fault attacks by hackers has been conducted, and example cases were announced by Infineon Technologies. Among these fault attack, there is a differential fault attack (DFA). The DFA may be misused (as a secret information acquiring means) by hackers desiring to obtain keys through a ciphertext having a fault (fault message) in a symmetrical algorithm such as the DES (for example).

According to conventional wisdom, leakage of secret information by the DFA may be prevented by performing an identical encryption twice. The resulting values of the encryptions may be compared. If the resulting values are different from each other, then encryption may be performed again so that a fault may be prevented. Another conventional method involves inputting a ciphertext through a communication line. The ciphertext may be stored and decoded. The decoded data may be again encrypted and compared with the ciphertext received through the communication line. Although these conventional techniques are generally thought to provide acceptable results, they are somewhat cumbersome since they involve comparing the results of operations performed twice. Furthermore performing operations twice may take a significant amount of time, thereby lowering the operation speed of a system.

SUMMARY OF THE INVENTION

According to exemplary, non-limiting embodiments of the present invention, a hardware cryptographic engine may prevent output of a final encryption result, even when an identical fault occurs in identical locations during parallel encryption processing using a symmetric algorithm such as the DES using two or more hardware ciphertext engines, thereby preventing leakage of secret information. Thus, the engine may be robust against fault attack and may not repeatedly perform the encryption operation such that the operation speed of the engine may be high.

In an exemplary embodiment, a hardware cryptographic method by which, even when an identical fault occurs in identical locations during parallel encryption processing using a symmetric algorithm such as the DES using two or more hardware ciphertext engines, the fault may be sensed before outputting a final encryption result, and leakage of secret information may be prevented. Thus, the method may be robust against fault attack and may not repeatedly perform the encryption operation such that the operation speed of the method may be high.

According to an exemplary embodiment of the present invention, a hardware cryptographic engine may include a plurality of ciphertext engines that may generate intermediate ciphertexts. A first one of the ciphertext engines may receive a second intermediate ciphertext output from a a second one of the ciphertext engines to generate a first intermediate ciphertext. The hardware cryptographic engine may output a final ciphertext when the intermediate ciphertexts generated by the ciphertext engines are identical to each other.

According to an exemplary embodiment of the present invention, the hardware cryptographic engine may include a first ciphertext engine, a second ciphertext engine, a comparison unit, and an encryption data output unit. The first ciphertext engine may receive a second intermediate ciphertext output from the second ciphertext engine, generate a first intermediate ciphertext, and use the first intermediate ciphertext to generate and output a first final ciphertext. The second ciphertext engine may output the second intermediate ciphertext, and use the second intermediate ciphertext generate and output a second final ciphertext. The comparison unit may generate and output a control signal having a logic state depending on whether the first final ciphertext is the same as the second final ciphertext. The encryption data output unit may respond to the logic state of the control signal, and output a final ciphertext when the first final ciphertext is the same as the second final ciphertext.

The second ciphertext engine may receive the first intermediate ciphertext output from the first ciphertext engine and generate the second intermediate ciphertext. Each of the first ciphertext engine and the second ciphertext engine may include a plurality of round blocks and a logic circuit. Each of the logic circuits may have inputs of a respective first intermediate ciphertext and a respective second intermediate ciphertext. Each of the round blocks of the first ciphertext engine may generate the respective first intermediate ciphertext, and each of the round blocks of the second ciphertext engine may generate the respective second intermediate ciphertext. The respective first and the respective second intermediate ciphertexts may be identical if no fault occurs. The logic circuit may have inputs of other intermediate ciphertexts that are the same as the respective second intermediate ciphertext in the second ciphertext engine and inputs of other intermediate ciphertexts that are the same as the respective first intermediate ciphertext in the first ciphertext engine. An odd number of intermediate ciphertexts may be input to the logic circuit. A logic circuit may be disposed in each round block. A logic circuit may be disposed at least once in each round block of two neighboring ciphertext engines.

According to another exemplary embodiment of the present invention, a method of encrypting transmission data is provided. The method may include performing a first encryption. The first encryption may involve receiving a second intermediate ciphertext to generate a first intermediate ciphertext, and using the first intermediate ciphertext to generate and output a first final ciphertext. The method may also include performing a second encryption. The second encryption may involve outputting the second intermediate ciphertext, and using the second intermediate ciphertext to generate and output a second final ciphertext. The method may also include generating and outputting a control signal having a logic state depending on whether the first final ciphertext is the same as the second final ciphertext. r, in response to the logic state of the control signal, a final ciphertext may be output when the first final ciphertext is the same as the second final ciphertext.

According to another exemplary embodiment, a ciphertext engine for encrypting transmission data may include a plurality of round blocks that generate respective intermediate ciphertexts. One of the round blocks may receive an odd number of intermediate ciphertext inputs, inclusive of an intermediate ciphertext from another ciphertext engine, to generate the respective intermediate ciphertext.

In an exemplary embodiment, a method of operating a ciphertext engine may include inputting an odd number of intermediate ciphertexts, inclusive of an intermediate ciphertext from another ciphertext engine. The method may also include generating an output ciphertext from the odd number of intermediate ciphertexts.

According to another exemplary embodiment of the present invention, a round block of a ciphertext engine for encrypting transmission data may include an encryption unit that may generate an intermediate ciphertext. A first logic operator may receive an odd number of intermediate ciphertexts, inclusive of an intermediate ciphertext from another ciphertext engine, to generate an intermediate ciphertext. A second logic operator may receive the intermediate ciphertext generated by the encryption unit and the intermediate ciphertext generated by the first logic operator.

In an exemplary embodiment, a method of operating a round block of a ciphertext engine for encrypting transmission data is provided. The method may include generating an intermediate ciphertext of an encryption unit and generating an intermediate ciphertext of a first logic operator based on inputs of an odd number of intermediate ciphertexts, inclusive of an intermediate ciphertext from another ciphertext engine. An intermediate ciphertext of a second logic operator may be generated based on inputs of the intermediated ciphertext of the encryption unit and the intermediate ciphertext of the first logic operator.

BRIEF DESCRIPTION OF THE DRAWINGS

Various features of the present invention will become readily apparent from the description of the exemplary, non-limiting embodiments that follows, with reference to the attached drawings in which.

DESCRIPTION OF EXEMPLARY EMBODIMENTS

Figure 1:
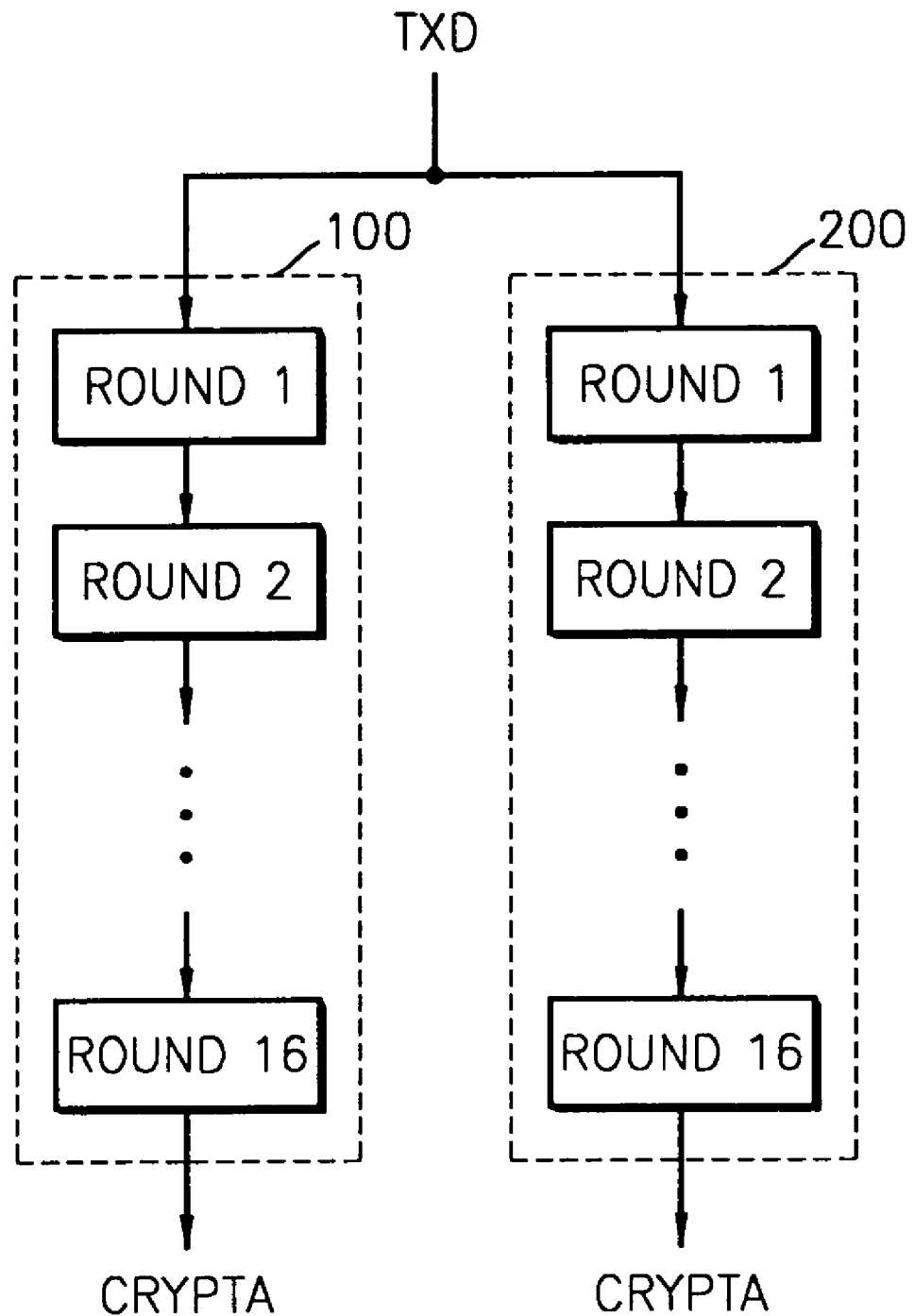
FIG. 1 is a block diagram of a prior art hardware cryptographic engine.
Figure 2:
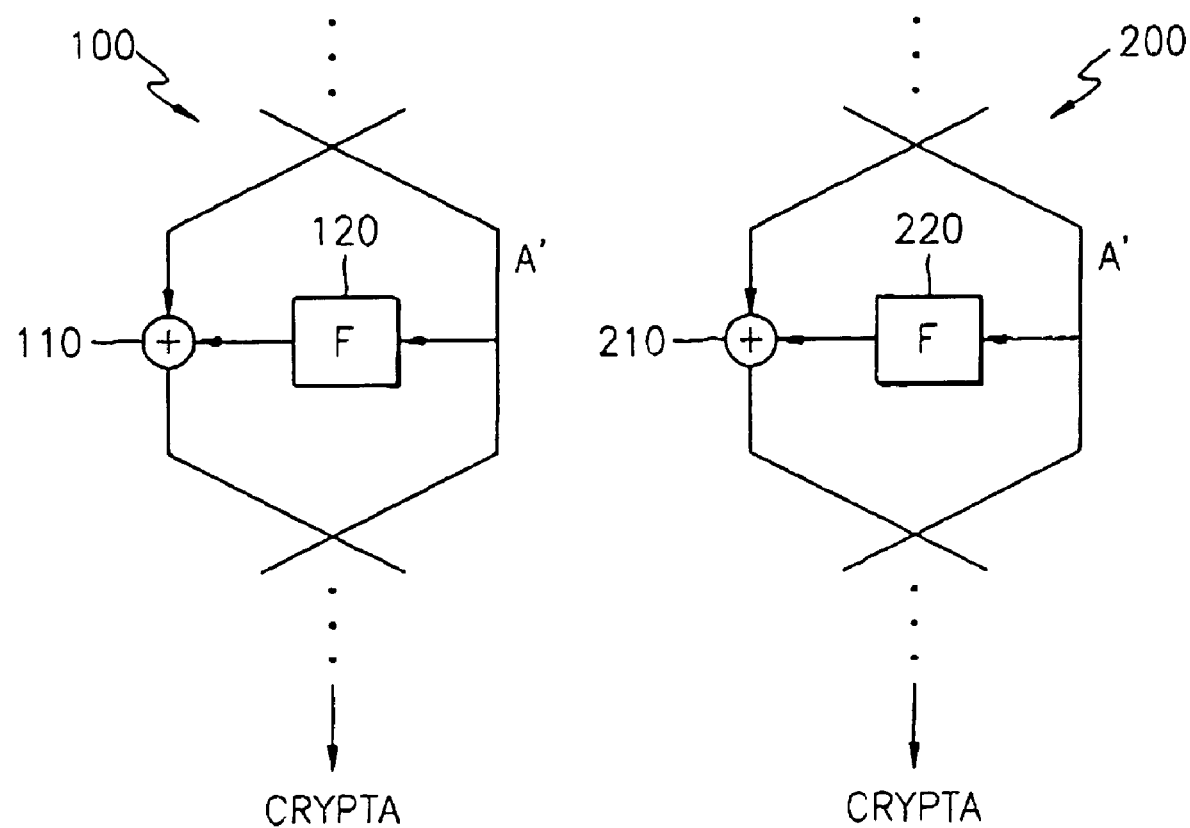
FIG. 2 is a schematic diagram of two round blocks depicted in FIG. 1.

Exemplary embodiments of the present invention will now be described more fully with reference to the accompanying drawings. Throughout the drawings, like reference numerals may be used to refer to like elements.

Figure 3:
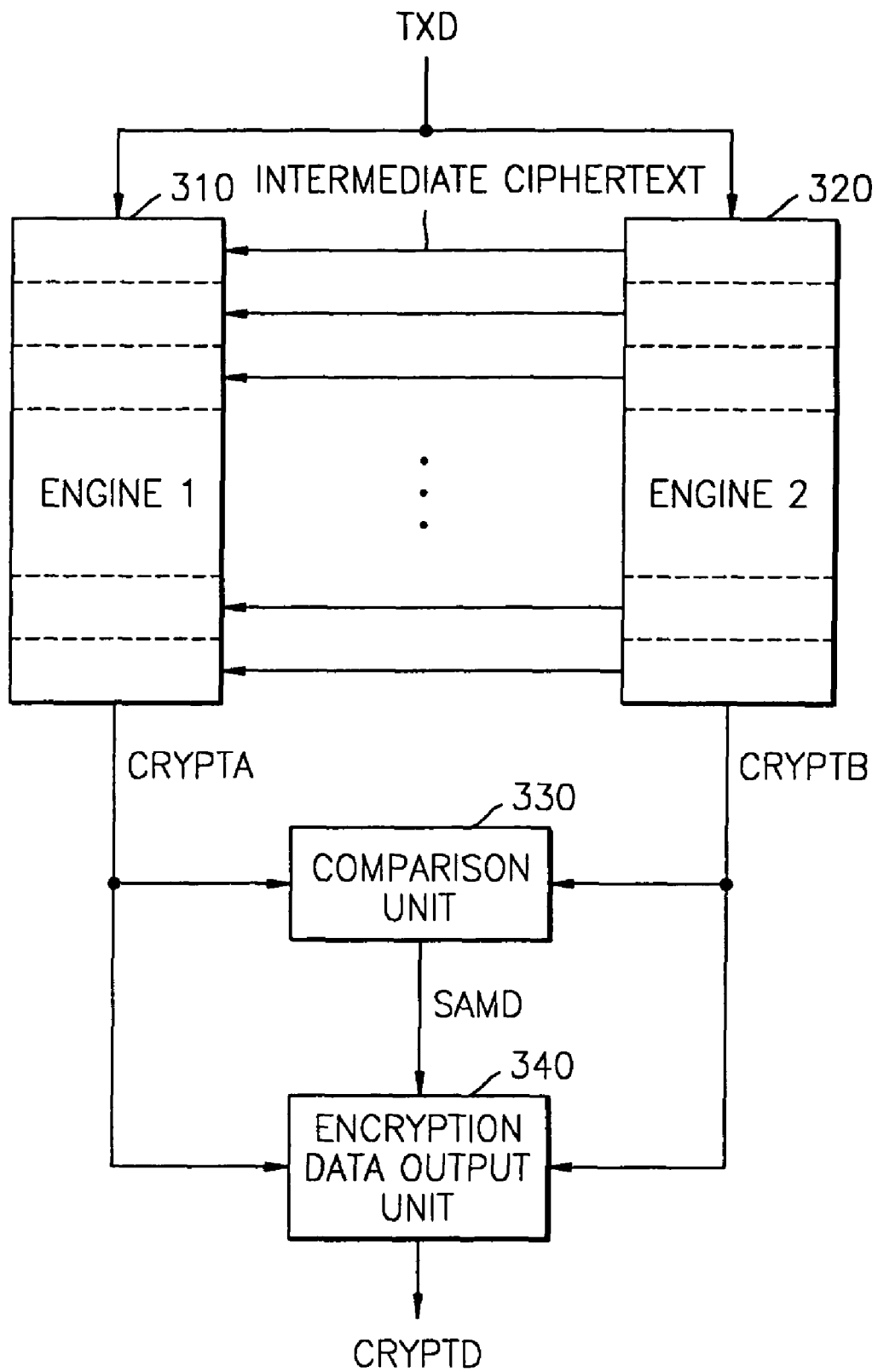
FIG. 3 is a block diagram of a hardware cryptographic engine according to an exemplary embodiment of the present invention.

With reference to FIG. 3, a hardware cryptographic engine according to an exemplary, non-limiting embodiment of the present invention may include a first ciphertext engine 310, a second ciphertext engine 320, a comparison unit 330, and an encryption data output unit 340.

Throughout the description, reference will be made to "intermediate ciphertext," which may indicate ciphertext at an intermediate stage of processing by the ciphertext engines 310, 320. Further, the terms "first" and "second" may be used as adjectives to indicate features associated with the first and the second ciphertext engines 310, 320, respectively. For example, the term "first intermediate ciphertext" may indicate intermediate ciphertext generated by the first ciphertext engine 310, while the term "second intermediate ciphertext" may indicate intermediate ciphertext generated by the second ciphertext engine 320.

The first ciphertext engine 310 may encrypt the inputted transmission data (TXD). During the encryption process, the first ciphertext engine 310 may receive a second intermediate ciphertext from the second ciphertext engine 320, generate a first intermediate ciphertext, and by using the first intermediate ciphertext, generate and output a first final ciphertext (CRYPTA).

The second ciphertext engine 320 may also encrypt the inputted transmission data (TXD). During the encryption process, the second ciphertext engine 320 may input a second intermediate ciphertext generated in each round to the first ciphertext engine 310, and also to a following round in the second ciphertext engine 320. The second ciphertext engine 320 may generate and output a second final ciphertext (CRYPTB).

The comparison unit 330 may generate an output control signal (SAMD) having a different logic state depending on whether or not the first final ciphertext (CRYPTA) is the same as the second final ciphertext (CRYPTB).

The encryption data output unit 340 may output a final ciphertext (CRYPD) when the first final ciphertext (CRYPTA) is the same as the second final ciphertext (CRYPTB), as indicated by the logic state of the output control signal (SAMD). For example, in response to an active state of the output control signal (SAMD) (for example, a logic "high" state), the encryption data output unit 340 may output the final ciphertext (CRYPTD).

For convenience of explanation, and to facilitate understanding, FIG. 3 illustrates a scenario in which the intermediate ciphertext output from each round of the second ciphertext engine 320 may be input to a corresponding round of the first ciphertext engine 310 in FIG. 3. However, the invention is not so limited in this regard, and may be modified in a variety of ways. For example, intermediate ciphertexts may be output from only selected rounds of the second ciphertext engine 320 and input to corresponding rounds of the first ciphertext engine 310. Also, an intermediate ciphertext from a round of the second ciphertext engine 320 may be sent to more than one round of the first ciphertext engine 310.

Figure 4:
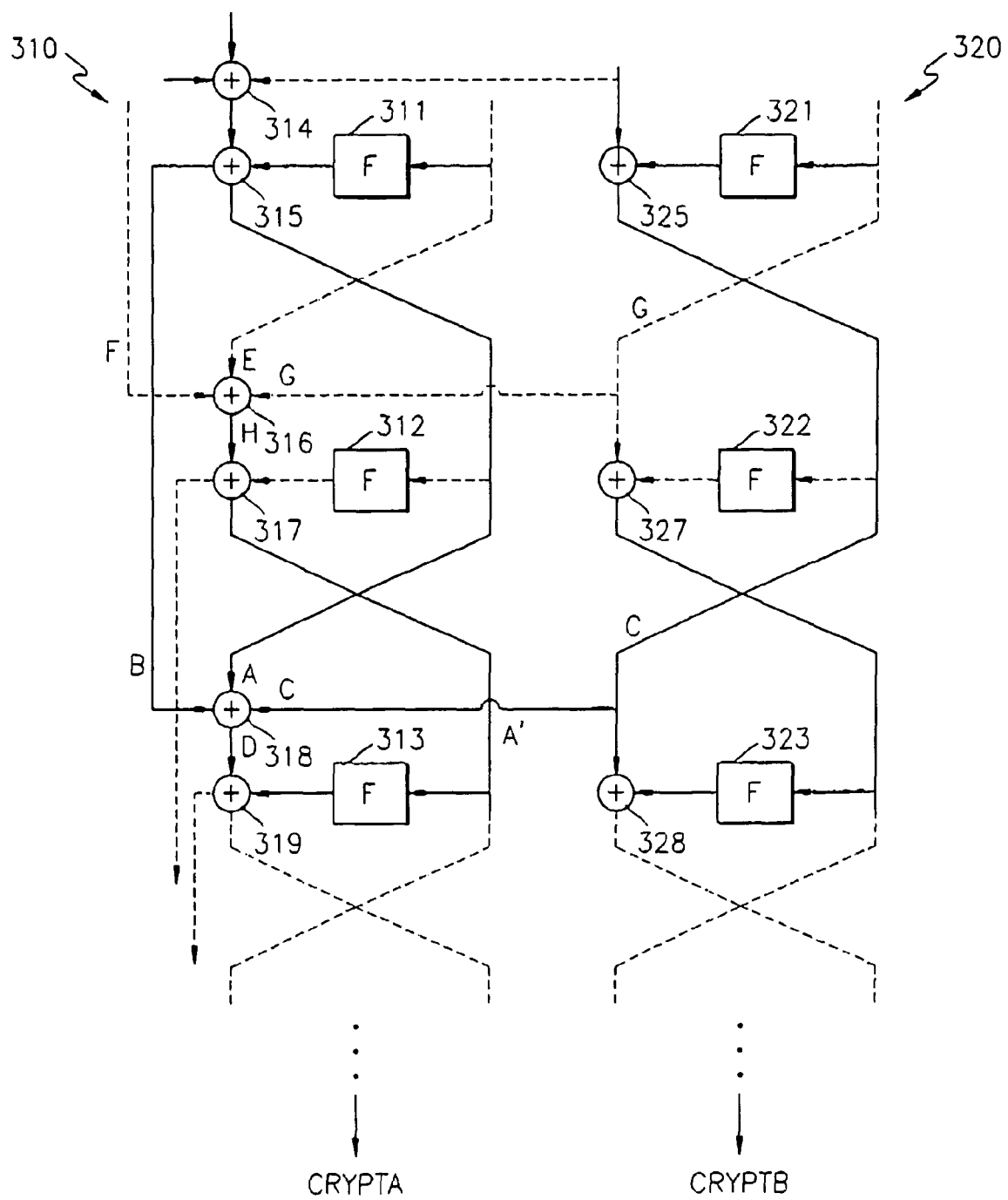
FIG. 4 is a partial, schematic diagram of an exemplary functionality of ciphertext engines.

FIG. 4 is a partial schematic diagram of an exemplary functionality of the ciphertext engines 310, 320 depicted in FIG. 3. Here, round blocks of the first ciphertext engine 310 may be shown on the left, while round blocks of the second ciphertext engine 320 may be shown on the right.

Each round block of the first ciphertext engine 310 may include two XOR logics and an encryption unit (F). For example, the lower most round block of the first ciphertext engine 310 depicted in FIG. 4 may include an upper XOR logic 318, a lower XOR logic 319, and an encryption unit 313. Each round block of the second ciphertext engine 320 may include an XOR logic and an encryption unit. For example, the lower most round block of the second ciphertext engine 320 depicted in FIG. 4 may include the XOR logic 328 and the encryption unit 323. The round blocks described above may be repeatedly disposed in each of the ciphertext engines 310, 320. However, alternative designs may be possible.

In a typical DES algorithm structure, the round blocks may repeatedly perform encryption through 16 rounds. The encryption units (F) may receive predetermined keys according to the DES algorithm, and encrypt and output data. As compared to the second ciphertext engine 320, the first ciphertext engine 310 may include round blocks having an additional XOR logic (for example, the upper XOR logic 318). The additional XOR logic, which may be present in each of the round blocks of the first ciphertext engine 310, may strengthen a fault sensing function. Further, even though the additional XOR logics may be implemented in the round blocks of the first ciphertext engine 310, when the first and the second ciphertext engines 310, 320 are without fault, the first and the second ciphertext engines 310, 320 may operate having symmetrically identical values in identical logic locations, as described in more detail below.

Each of the plurality of round blocks of the first ciphertext engine 310 may receive and odd number of inputs, inclusive of first intermediate ciphertexts from preceding round blocks of the first ciphertext engine 310, and a second intermediate ciphertext from a corresponding round block of the second ciphertext engine 320. Consider the lower most round block of the first ciphertext engine 310 depicted in FIG. 4. This round block may receive two first intermediate ciphertexts A, B (from preceding round blocks of the first ciphertext engine 310), and the second intermediate ciphertext C (from the second ciphertext engine 320). The three intermediate ciphertexts A, B, C may be inputs of the additional XOR logic 318 of the round block.

In a no fault scenario, all of the intermediate ciphertexts A, B, C may have the same value. That is, an odd number of identical intermediate ciphertexts (including the second intermediate ciphertext C) may be inputs of the XOR logic 318. When the odd number of inputs A, B, C are identical, the intermediate ciphertext D output from the XOR logic 318 may be normal (that is, there is no fault). Here, the intermediate ciphertext D from the XOR logic 318 may be identical to the second intermediate ciphertext C. The intermediate ciphertext D may be an input of the XOR logic 319 of the round block in the first ciphertext engine 310, while the second intermediate ciphertext C may be an input of the XOR logic 328 of a corresponding round block in the second ciphertext engine 320. In this way, the first and the second ciphertext engines 310, 320 may operate having identical values in identical logic locations.

In this exemplary embodiment, the odd number of inputs A, B, C of the additional XOR logic (e.g., 318) may be 3. However, the invention is not so limited and the number of inputs may be greater than 3.

The functionality of the additional XOR logics (e.g., 318) receiving an odd number (which may be 3 or more) of identical intermediate ciphertexts may be represented by the following equation 1. In equation 1, m may denote a digital data value of the intermediate ciphertexts, and ⊕ may denote an exclusive OR (XOR) logic operator:

$$m \oplus m \oplus m = m \tag{1}$$

Accordingly, in the above example, A, B, C, and D may be in identical logic operation locations, and unless there is a fault, these may be the same intermediate ciphertexts.

The additional XOR logic (for example, 318) receiving three or more odd number identical intermediate ciphertexts may be disposed in each of the round blocks. However, depending on the objective and the complexity of a circuit, a round block may include more than one additional XOR logic.

Now consider a scenario in which faults may occur in both the first and the second ciphertext engines 310, 320. Even if the faults are identical and occur at corresponding locations of the first and the second ciphertext engines 310, 320, the final ciphertext (CRYPTA) output from the first ciphertext engine 310 may be different than the final ciphertext (CRYPTB) output from the second ciphertext engine 320.

For example, and with reference to FIG. 4, assume that a fault occurs in the second ciphertext engine 320 at the logic operation location that may generate the second intermediate ciphertext C. Further assume that an identical fault occurs in the first ciphertext engine 310 at the logic operation location that may generate the first intermediate ciphertext A. Here, both the second intermediate ciphertext C and the first intermediate ciphertext A may experience a fault, and the first intermediate ciphertext B may not experience a fault. Thus, with reference to equation 1 above, the value of ciphertexts A and C may be changed from m to m'. That is, m' may denote the digital data value of the faulted intermediate ciphertexts A, C. Based on these inputs, the XOR logic 318 may output an intermediate ciphertext D having the value m. This functionality may be represented by the following equation 2:

$$m \oplus m' \oplus m' = m \tag{2}$$

Accordingly, the first final ciphertext (CRYPTA) may be follow-up encrypted and generated using intermediate ciphertext D (having a value of m), while the second final ciphertext (CRYPTB) may be follow-up encrypted and generated using intermediate ciphertext C (having a value of m'). As a result, the first final ciphertext (CRYPTA) may be different from the second final ciphertext (CRYPTB), such that the occurrence of the faults may be appropriately detected.

Figure 5:
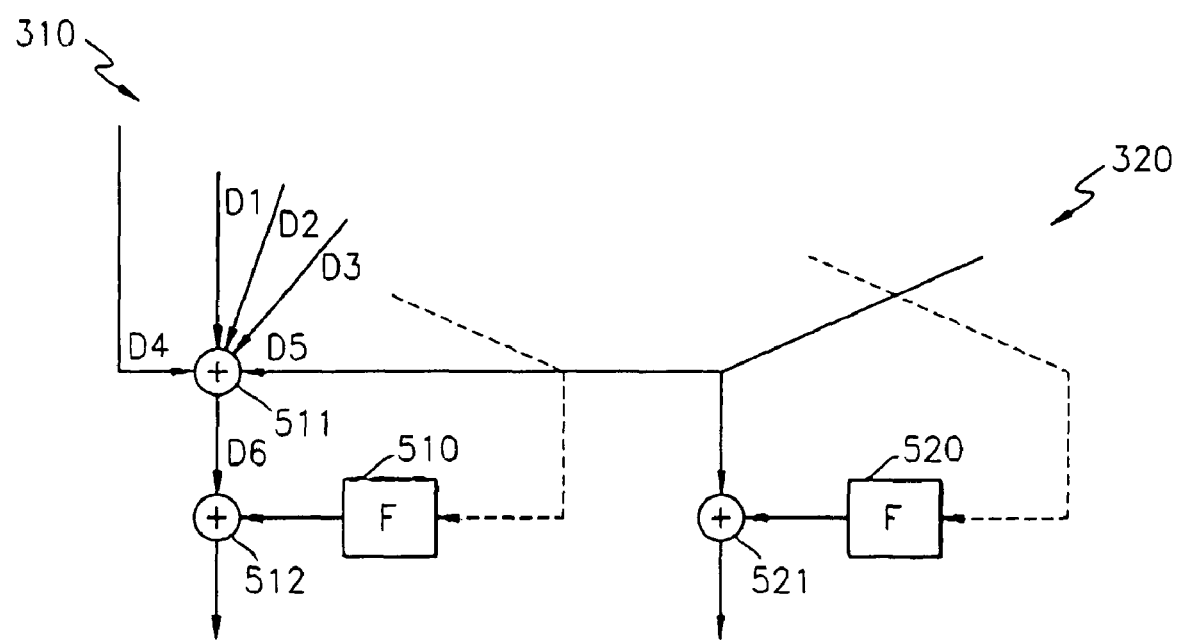
FIG. 5 is a partial, schematic diagram of another exemplary functionality of ciphertext engines.

FIG. 5 is a partial, schematic diagram of another exemplary functionality of the ciphertext engines depicted in FIG. 3. Here, a round block of the first ciphertext engine 310 may receive the second intermediate ciphertext (for example, D5) from the second ciphertext engine 320, and a plurality of first intermediate ciphertexts (for example, D1 through D4) in the first ciphertext engine 310 that may have the same ciphertext as the intermediate ciphertext D5. More specifically, the round block of the first ciphertext engine 310 may include an additional XOR logic (for example 511) that may receive the ciphertexts D1 through D5 as inputs. If these five intermediate ciphertexts are identical, then the functionality of the XOR logic (for example, 511) may be represented by the following equation 3:

$$m \oplus m \oplus m \oplus m \oplus m = m \tag{3}$$

As described above, the second ciphertext engine 320 may also include a plurality of round blocks. Each of the round blocks disposed in the second ciphertext engine 320 may output a second intermediate ciphertext.

Figure 6:
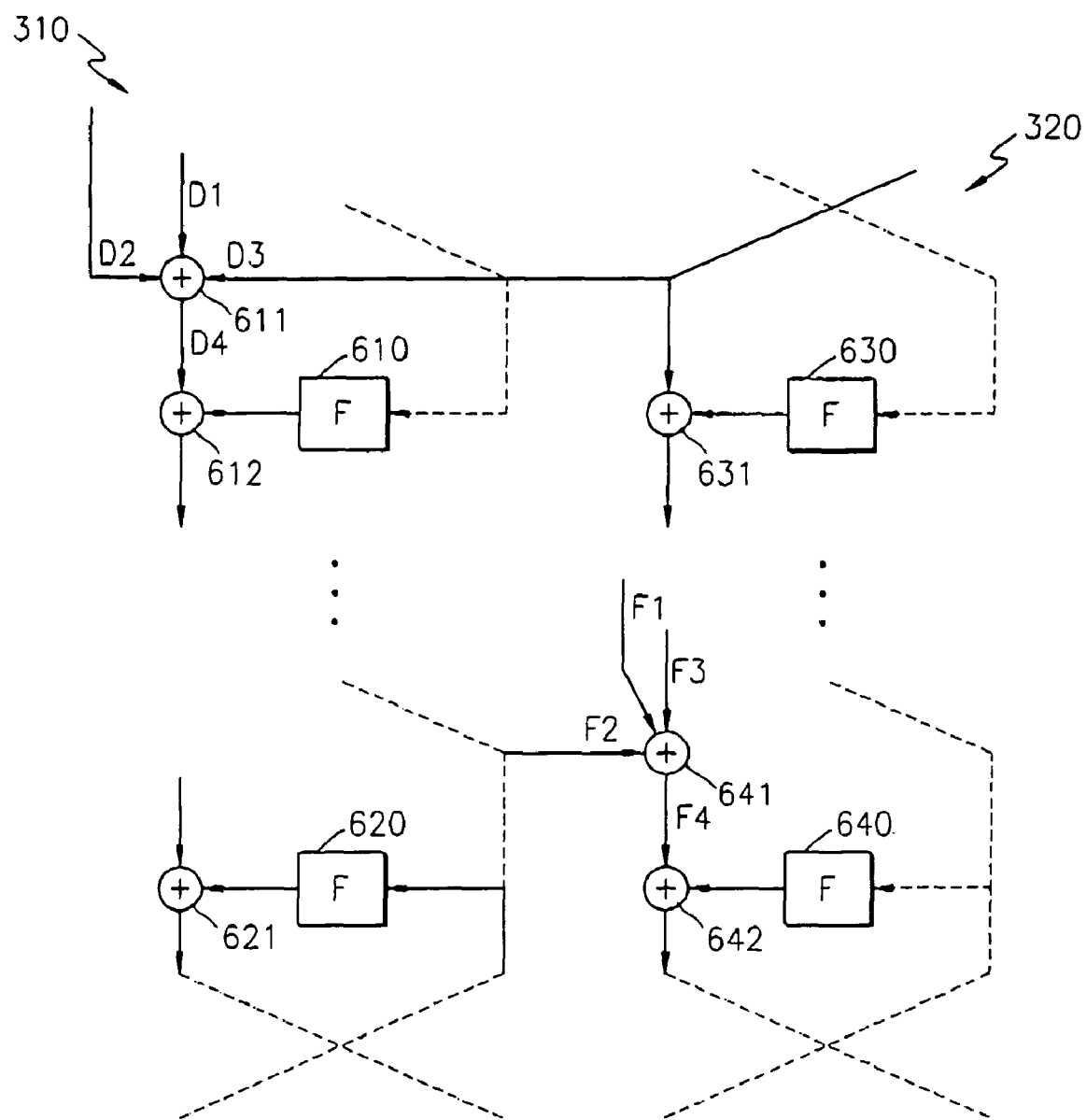
FIG. 6 is a partial, schematic diagram of another exemplary functionality of ciphertext engines.

FIG. 6 is a partial schematic diagram of another exemplary functionality of the ciphertext engines depicted in FIG. 3. Here, during encryption of transmission input data (TXD), the second ciphertext engine 320 may receive a first intermediate ciphertext (for example, F2) from the first ciphertext engine 310, generate a second intermediate ciphertext (F4), and by using the second intermediate ciphertext (F4), generate and output the second final ciphertext (CRYPTB). More specifically, the round block of the second ciphertext engine 320 may include an additional XOR logic (for example 641). The additional XOR logic may receive an odd number (that is greater than or equal to 3) of intermediate ciphertexts, including second intermediate ciphertexts (for example, F1, F3) in the second ciphertext engine 320 itself, and the first intermediate ciphertext (for example F2) from the first ciphertext engine. The second intermediate ciphertexts (for example, F1, F3) may have the same value as the first intermediate ciphertext (F2). Accordingly, in a no fault scenario, the logic operation location and ciphertext of the output (F4) of the XOR logic 641 may be the same as those of the first intermediate ciphertext (F2).

Figure 7:
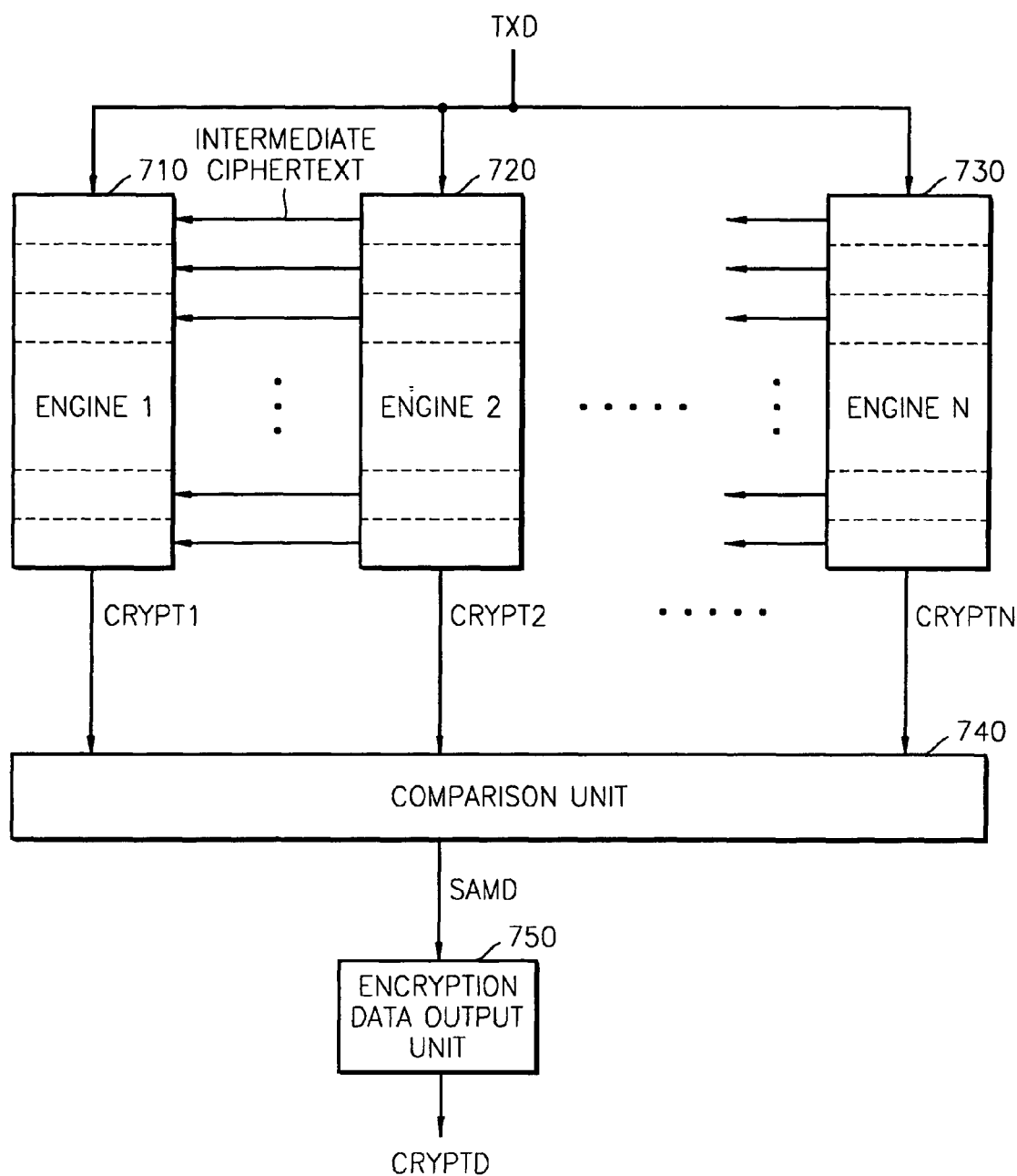
FIG. 7 is a block diagram of a hardware cryptographic engine according to another exemplary embodiment of the present invention.

FIG. 7 is a block diagram of a hardware cryptographic engine according to another exemplary embodiment of the present invention. Here, the hardware cryptographic engine may include a plurality of ciphertext engines 710, 720, 730, a comparison unit 740, and an encryption data output unit 750. Each of the ciphertext engines 710, 720, 730 may include a plurality of round blocks. Each of the round blocks may have a structure and functionality that is similar to the structure and functionality of any of the round blocks shown in FIGS. 4 through 6.

Each of the ciphertext engines 710, 720, 730 may encrypt transmission input data (TXD). In so doing, each ciphertext engine may receive and process intermediate ciphertexts from other engines, and generate an intermediate ciphertext that may have the same logic operation location and ciphertext as those of the other engines. Using the generated intermediate ciphertexts and by operations using symmetrically identical values, the ciphertext engines 710, 720, 730 may respectively generate and output final ciphertexts (CRYPT1), (CRYPT2), (CRYPTN).

In addition to the intermediate ciphertext from the other engines, each round block of the ciphertext engines 710, 720, 730 may further receive other intermediate ciphertexts that may have the same value as the intermediate ciphertext from the other engines. In this way, an XOR logic of each round block may receive an odd number (which is greater than or equal to three) of identical intermediate ciphertexts including the intermediate ciphertext received from another engine. The logic operation location and ciphertext of the output of the XOR logic may be the same as those of the intermediate ciphertext of the other engine. Here, the XOR logic receiving the three or more odd number identical intermediate ciphertexts may be disposed in each of the round blocks. Also, an XOR logic receiving three or more odd number identical intermediate ciphertexts may be disposed in each round block of two neighboring ciphertext engines.

The comparison unit 740 may generate and output a control signal (SAMD) that may have a different logic state depending on whether the final ciphertexts from the ciphertexts engines 710, 720, 730 are all the same.

The encryption data output unit 750 (in response to the logic state of the output control signal (SAMD)) may output one of the final ciphertexts (CRYPT1 through CRYPTN) as a normal final ciphertext (CRYPTD) when the final ciphertexts (CRYPT1 through CRYPTN) are all the same. For example, in response to an active state of the output control signal (SAMD), the encryption data output unit 750 may output one of the final ciphertexts (CRYPT1 through CRYPTN) as a final ciphertext (CRYPTD).

Accordingly, in the hardware cryptographic engine shown in FIG. 7, if a fault occurs in a logic operation location of a particular engine, and if an identical fault occurs in the same logic operation location in another engine, the engine receiving the intermediate ciphertext from the other engine may output a final ciphertext that may be different from that of the other engine.

According to this exemplary embodiment of the present invention, each of the ciphertext engines 710, 720, 730 may have a plurality of round blocks. Each round block may receive an odd number (greater than or equal to three) of intermediate ciphertexts, including an intermediate ciphertext received from another engine. The odd number of intermediate ciphertexts may be inputs of an XOR logic of a round block. When the inputs of the XOR logic are identical, the logic operation location and ciphertext of the output of the XOR logic may be the same the intermediate ciphertext received from the other engine. Accordingly, even when an identical fault occurs in identical locations of a plurality of ciphertext engines 710, 720, 730, the fault may be detected before outputting a final encryption result.

As described above, in a process performing parallel encryption operations according to a symmetric algorithm (such as DES, for example) using two or more hardware ciphertext engines, even when an identical fault occurs in identical locations, the interdependent parallel processing hardware cryptographic engine may detect the fault before outputting a final encryption result. In this way, a leakage of secret information may be prevented. Accordingly, the engine may be robust against fault attack, and may have a high operation speed because it does not repeatedly perform the encryption operation.

Exemplary embodiments of the invention have been explained above and illustrated in the figures. However, the present invention is not limited to the disclosed embodiments since numerous and varied modifications may be implemented by those skilled in the art, without departing from the spirit and scope of the present invention defined in the appended claims.

For example, the elements in FIGS. 3-7 describing the exemplary apparatus and methods may be implemented in hardware and/or software. The hardware/software implementations may include a combination of processor(s) and article(s) of manufacture. The article(s) of manufacture may include storage media and executable computer program(s). The executable computer program(s) may include the instructions to perform the described operations or functions. The computer executable program(s) may be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. A hardware cryptographic engine for encrypting transmission data, the hardware cryptographic engine comprising:
    a first ciphertext engine that receives a second intermediate ciphertext output from a second ciphertext engine, generates a first intermediate ciphertext, and uses the first intermediate ciphertext to generate and output a first final ciphertext;
    the second ciphertext engine that outputs the second intermediate ciphertext, and uses the second intermediate ciphertext to generate and output a second final ciphertext;
    a comparison unit that generates and outputs a control signal having a logic state depending on whether the first final ciphertext is the same as the second final ciphertext; and
    an encryption data output unit that responds to the logic state of the control signal, and outputs a final ciphertext when the first final ciphertext is the same as the second final ciphertext;
    wherein the second ciphertext engine receives the first intermediate ciphertext output from the first ciphertext engine and generates a subsequent second intermediate ciphertext, and
    wherein each of the first ciphertext engine and the second ciphertext engine comprises a plurality of round blocks and a logic circuit that detects if fault occurs in the round blocks and the logic circuit receives a respective first intermediate ciphertext and a respective second intermediate ciphertext, each of the round blocks of the first ciphertext engine generates the respective first intermediate ciphertext, and each of the round blocks of the second ciphertext engine generates the respective second intermediate ciphertext.

2. The hardware cryptographic engine of claim 1, wherein the respective first and the respective second intermediate ciphertexts are identical if no fault occurs.

3. The hardware cryptographic engine of claim 1, wherein the logic circuit further has inputs of other intermediate ciphertexts that are the same as the respective second intermediate ciphertext in the second ciphertext engine and inputs of other intermediate ciphertexts that are the same as the respective first intermediate ciphertext in the first ciphertext engine.

4. The hardware cryptographic engine of claim 1, wherein an odd number of intermediate ciphertexts is input to the logic circuit.

5. The hardware cryptographic engine of claim 1, wherein the logic circuit is disposed in each round block.

6. The hardware cryptographic engine of claim 1, wherein the logic circuit is disposed at least once in each round block of two neighboring ciphertext engines.

7. The hardware cryptographic engine of claim 1, wherein the logic circuit is an XOR (exclusive-OR) gate.

8. A method of encrypting transmission data, the method comprising:
    performing a first encryption that involves receiving a second intermediate ciphertext to generate a first intermediate ciphertext, and using the first intermediate ciphertext to generate and output a first final ciphertext;
    performing a second encryption that involves outputting the second intermediate ciphertext, and using the second intermediate ciphertext to generate and output a second final ciphertext;
    generating and outputting a control signal having a logic state depending on whether the first final ciphertext is the same as the second final ciphertext; and responding to the logic state of the control signal by outputting a final ciphertext when the first final ciphertext is the same as the second final ciphertext;

wherein the second encryption further involves receiving the first intermediate ciphertext and generating a subsequent second intermediate ciphertext, wherein the first encryption is performed in a plurality of round blocks of a first ciphertext engine, the second encryption is performed in a plurality of round blocks of a second ciphertext engine, and the first ciphertext engine and the second ciphertext engine use a logic circuit receiving a respective first intermediate ciphertext and a respective second intermediate ciphertext as an input, and wherein the logic circuit detects if fault occurs in the round blocks.

9. The method of claim 8, wherein the respective first and the respective second intermediate ciphertexts are identical if no fault occurs.

10. The method of claim 8, wherein the logic circuit further has inputs of other intermediate ciphertexts that are the same as the respective second intermediate ciphertext in the second ciphertext engine and inputs of other intermediate ciphertexts that are the same as the respective first intermediate ciphertext in the first ciphertext engine.

11. The method of claim 8, wherein an odd number of intermediate ciphertexts is input to the logic circuit.

12. The method of claim 8, wherein the logic circuit is disposed in each round block.

13. The method of claim 8, wherein the logic circuit is used at least once in each round block of two neighboring ciphertext engines.

14. The method of claim 8, wherein the logic circuit is an XOR (exclusive-OR) gate.

* * * * *